Patented Aug. 10, 1926.

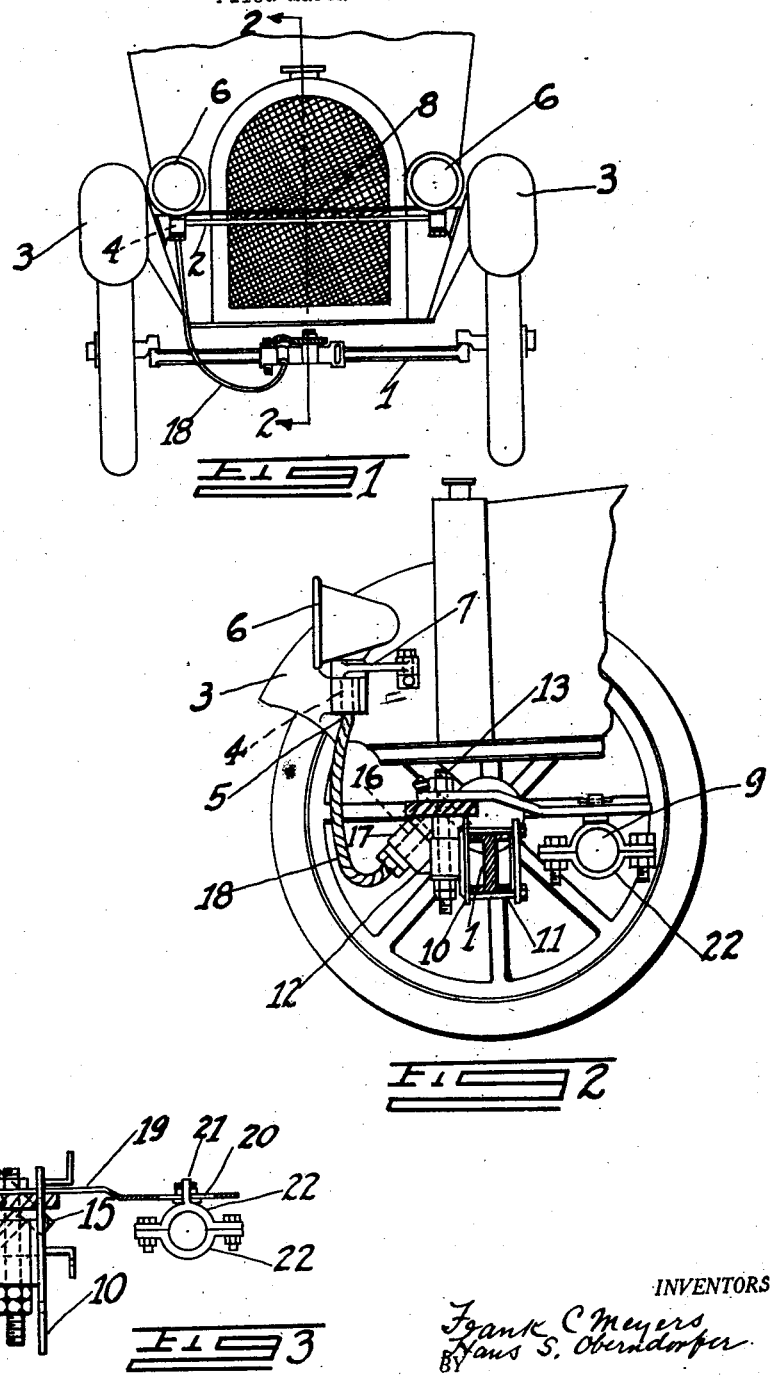

1,595,161

UNITED STATES PATENT OFFICE.

FRANK C. MEYERS AND HANS S. OBERNDORFER, OF CINCINNATI, OHIO.

DIRIGIBLE HEADLIGHT FOR AUTOMOBILES.

Application filed March 11, 1926. Serial No. 94,014.

Our invention relates to headlights for automobiles which are pivotally mounted on vertical axles and which are controlled by the steering mechanism of the automobile so that the rays of reflected light will extend in the direction of travel of the car.

It is the object of our invention to provide mechanism by which linear movement of the steering mechanism may be transmitted by means of reduction gears into rotary movement of the axles of the headlights, so that when the automobile is being steered around a corner or on a winding road the lights will automatically cast their rays in advance in the curving direction of travel. In combination with the above mechanism it is also our object to provide a flexible shaft connecting the mechanism above referred to with the lights and to so connect the flexible shaft that it will not be subject to variations in movement due to relative movement between the chassis of the automobile which supports the mechanism for transforming the linear movement into rotary movement, and the spring carried body portion of the machine, which supports the headlights.

There has been considerable development in devices of this character. For example Sheridan, in his Patent #1,137,672, shows a flexible shaft connected in such a way as to pivot the headlights on their vertical axles with the movement of the steering knuckle connecting rod. It is thought that Sheridan, however, does not disclose the features of our invention inasmuch as he does not provide any means of increasing the rotary movement supplied to his pivoting lights except the direct rotary movement from a pivoted arm which has an end moved directly by the connecting rod. Neither does Sheridan disclose a flexible shaft disposed in such a position as to be entirely free from variation due to relative movement of the chassis with relation to the body of the vehicle on which his lights are mounted.

The modifications which we have made over the device of Sheridan spell the difference between a successfully operative device and one which is of very doubtful practical importance.

Referring to the drawings in which we have specifically described our improvements in dirigible headlight control mechanism:

Figure 1 is a front elevation of an automobile showing our mechanism in operative position.

Figure 2 is a sectional view of the portion of the automobile shown in Figure 1 as indicated by the lines 2—2 in Figure 1.

Figure 3 is a side elevation with parts in section of the reduction gear mechanism.

Generally indicated at 1 is the front axle of the automobile. The body which is spring-carried in the usual manner, has a rod 2 extending across between the fenders 3. The rod has lamp post holes 4 through which vertical lamp axles 5 rigidly secured to the lamps 6 are rotatably mounted. Extending out from the lamps are brackets 7 which are connected together by a link 8 so that it is only necessary to rotate one of the lamps on its axis and the other will move to a corresponding axial position. The brackets 7 are rigidly secured to the lamps 6 and may be connected in any suitable manner. Referring to Figure 2 there is shown the front axle 1 and the steering knuckle connecting rod 9 which provides a means for controlling the steering movement of one of the wheels by the other. Figure 3 shows a reduction gear mechanism made in accordance with our invention. There is provided a mounting plate 10 which may be secured to the axle 1 by means of U bolts 11 as shown in Figure 2. The plate has mounted on it a bearing box 12 in which a rotatably journaled shaft 13 is secured. On the shaft 13 we have fixedly mounted a spiral gear wheel 14 having teeth which mesh with the spiral gear 15 which is mounted on another shaft 16 which is rotatably mounted in another bearing box 17 also secured to the mounting plate 10. We preferably mount the shaft 16 so that it extends in a downward direction so that when the flexible shaft 18 which may be of any desired type is secured to the shaft 16 and also to the lower end one of the vertical lamp axles the flexible tube will describe an arc extending downwardly from the chassis and then curving up to its point of engagement with one of the posts 5. By disposing the flexible shaft in such a position any relative movement between the chassis frame of the vehicle and the body portion will not distort the tubing from a position in which there is a downward bulge due to the weight of the shaft.

Fixedly mounted on the shaft 13 is an arm 19 having a longitudinal slot 20 extending between its upper and lower surface. Within the slot 20 we have provided a sliding post 21 which is connected with clamping plates 22 which are secured to the steering knuckle connecting rod 9 in the obvious manner.

We have found that the reduction gear to be effective must be on approximately a ratio of two to one. The rotation of the shaft 13 through an arc of rotation of ten degrees will thus move the shaft 16 through an arc of rotation of twenty degrees. The lateral movement of the steering knuckle connecting rod is never enough to provide rotary movement directly to a rotatable shaft connected directly to dirigible lights which will move the lights so that they will cast rays of light around a curve in advance of the movement of the vehicle which feature is of great practical importance.

While modifications in journal boxes and clamps will readily occur to those skilled in the art, it is our desire to claim such mechanical equivalent structures limited, however, to mechanism having the essential features of our invention which are the use of reduction gear means to approximately double the rotary movement of the shaft directly connected with the steering knuckle connecting rod and the use of a flexible shaft suspended in a downwardly bulging position.

Having thus described our invention, what we claim as new and desire to secure by Letters Patent, is:—

In a motor vehicle, the combination with a pivotally mounted lamp and a laterally extending steering knuckle connecting rod, of a flexible shaft suspended in a downwardly bulging arc connected with said lamp pivot and interconnected mechanism for transmitting linear movement of said rod in a lateral direction into rotary movement of said flexible shaft, said interconnecting mechanism comprising an arm mounted on a pivot pin carrying a toothed gear, with means for slidably connecting said arm to said rod, and a downwardly slanting shaft carrying a gear having approximately one-half the number of teeth as the first mentioned gear, said gear meshing with the first named gear, and said slanting shaft connected with said flexible shaft.

FRANK C. MEYERS.
HANS S. OBERNDORFER.